United States Patent [19]
Moyles

[11] Patent Number: 5,085,548
[45] Date of Patent: Feb. 4, 1992

[54] NUT AND SNAP RING POSITION LOCKING DEVICE

[75] Inventor: Mervyn W. Moyles, Saratoga, Calif.

[73] Assignee: The United States of America as represented by the Secretary of the Navy, Washington, D.C.

[21] Appl. No.: 693,742

[22] Filed: Apr. 30, 1991

[51] Int. Cl.⁵ .................... F16B 39/04; F16B 21/18
[52] U.S. Cl. .................... 411/316; 411/353; 411/522; 411/940; 411/946
[58] Field of Search ........ 411/294, 296, 299, 316-318, 411/945, 946, 280, 352, 353, 940, 522; 403/326, 329, 328

[56] References Cited

U.S. PATENT DOCUMENTS

| | | | |
|---|---|---|---|
| 1,619,291 | 3/1927 | Crawford et al. | 411/316 |
| 2,443,614 | 6/1948 | Gray | 411/280 |
| 3,987,697 | 10/1976 | Wurzel | 411/353 |
| 4,886,408 | 12/1989 | Killian et al. | 411/522 |

FOREIGN PATENT DOCUMENTS 125055 12/1919 United Kingdom ................ 411/316

OTHER PUBLICATIONS

MACHINE DESIGN Magazine, Fastening & Joining Reference Issue for 1977, Vol. 49, No. 26, Nov. 17, 1977; pages 45 & 99, and inside of front cover. Published by Penton/IPC, a subsidiary of Pittway Corp., Penton Plaza, Cleveland, Ohio 44114.

Primary Examiner—Neill R. Wilson
Attorney, Agent, or Firm—Wayne O. Hadland; Kenneth L. Warsh; Robert Wohlfarth

[57] ABSTRACT

An apparatus for preventing the rotation of a nut with respect to a threaded shaft, one version suitable for use on a plain threaded shaft and another version suitable for use on a threaded shaft having an axial keyway of rectangular cross section. The apparatus consists of a slotted and grooved nut and a tanged snap ring. The nut has radial slots across a face, and a circumferential groove which intersects the bottom of the slots. The snap ring fits over the nut within the circumferential groove, the tang extending down through the nut and engaging with the threaded shaft.

22 Claims, 5 Drawing Sheets

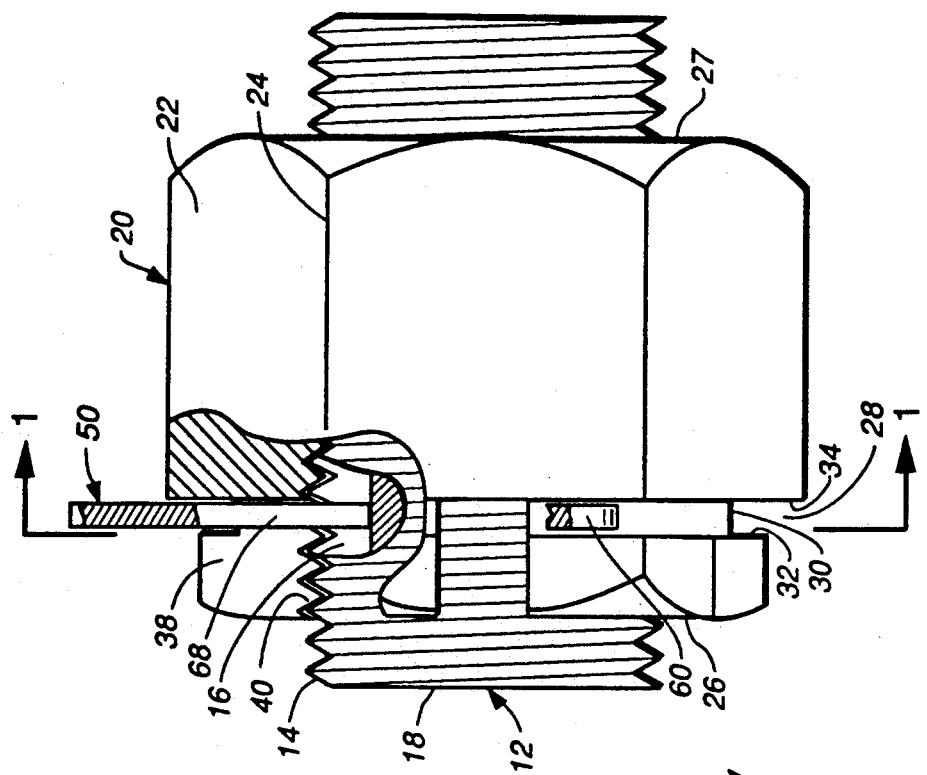
FIG._2
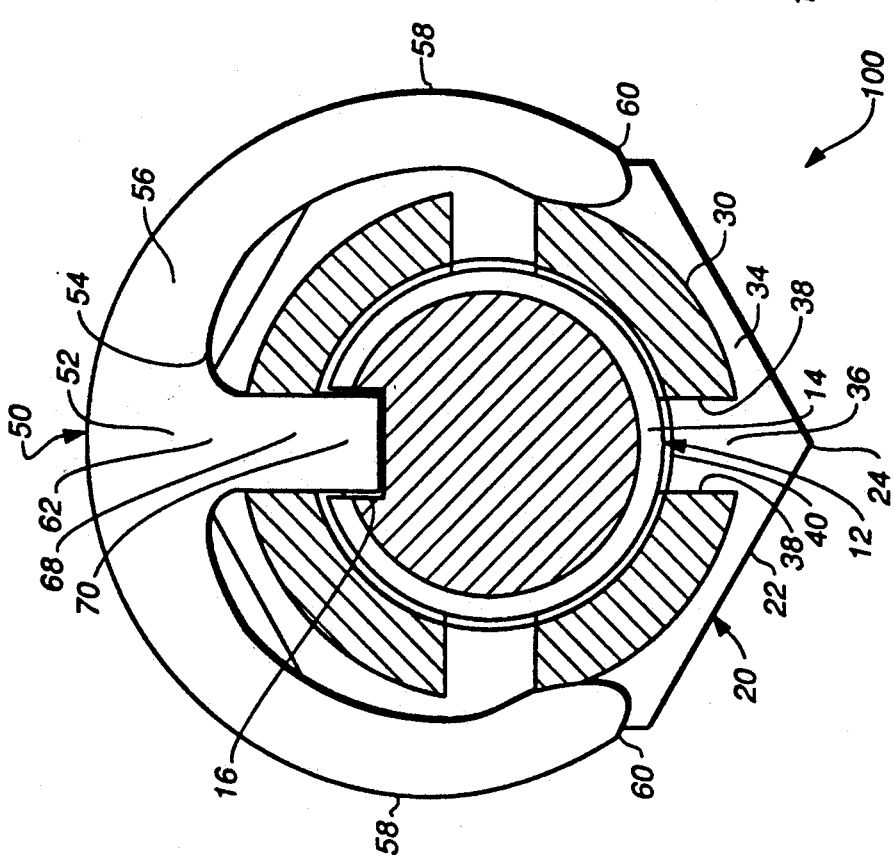
FIG._1

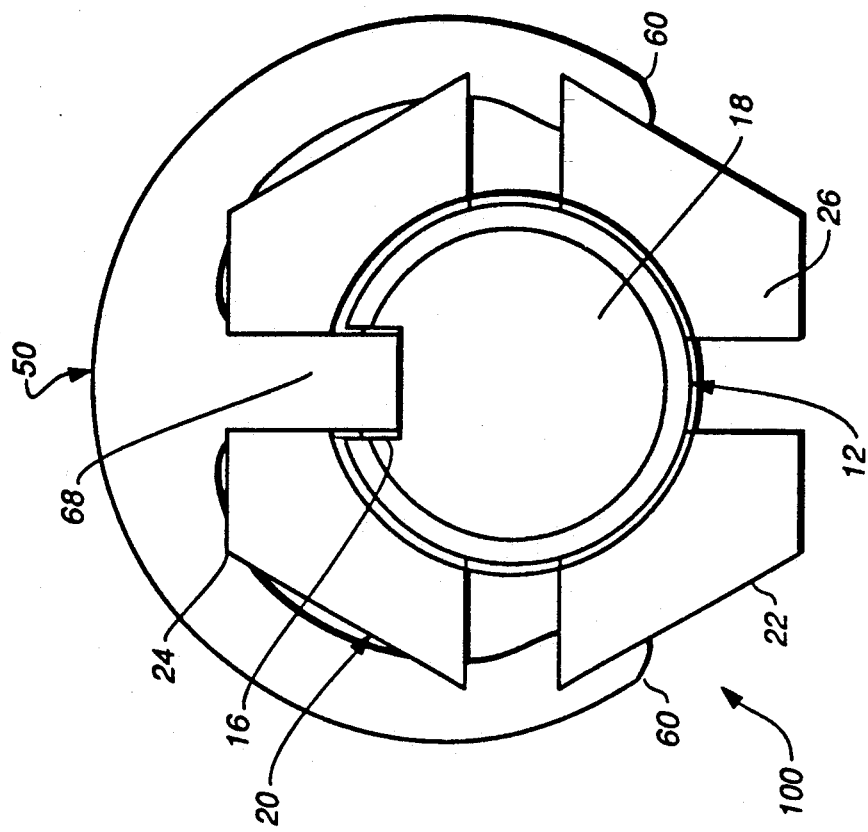
FIG._4
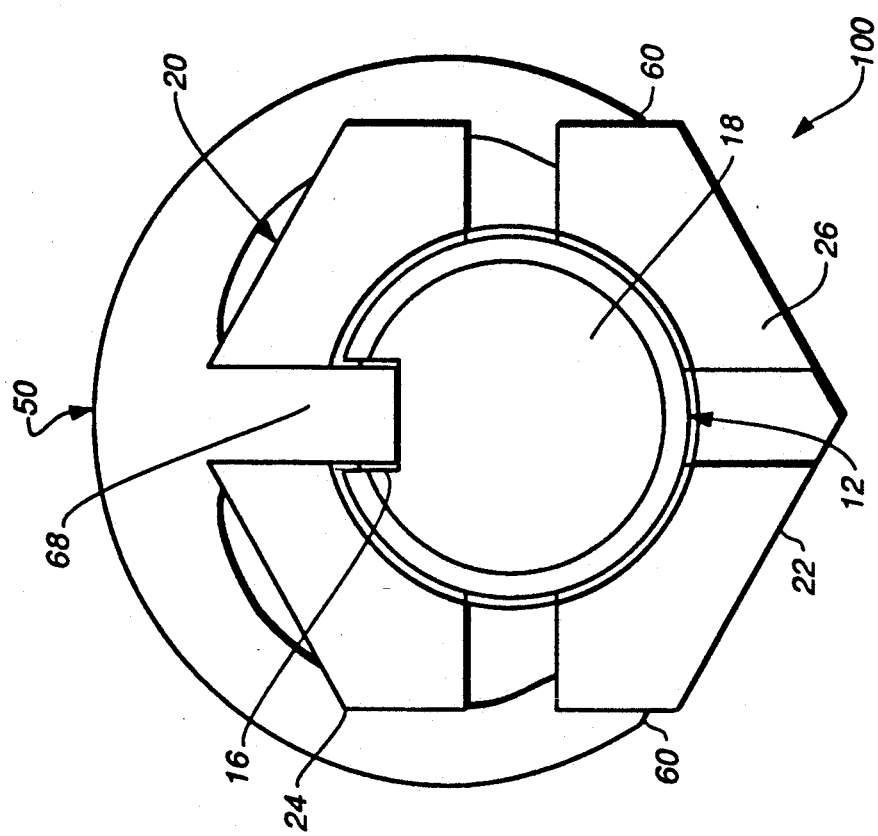
FIG._3

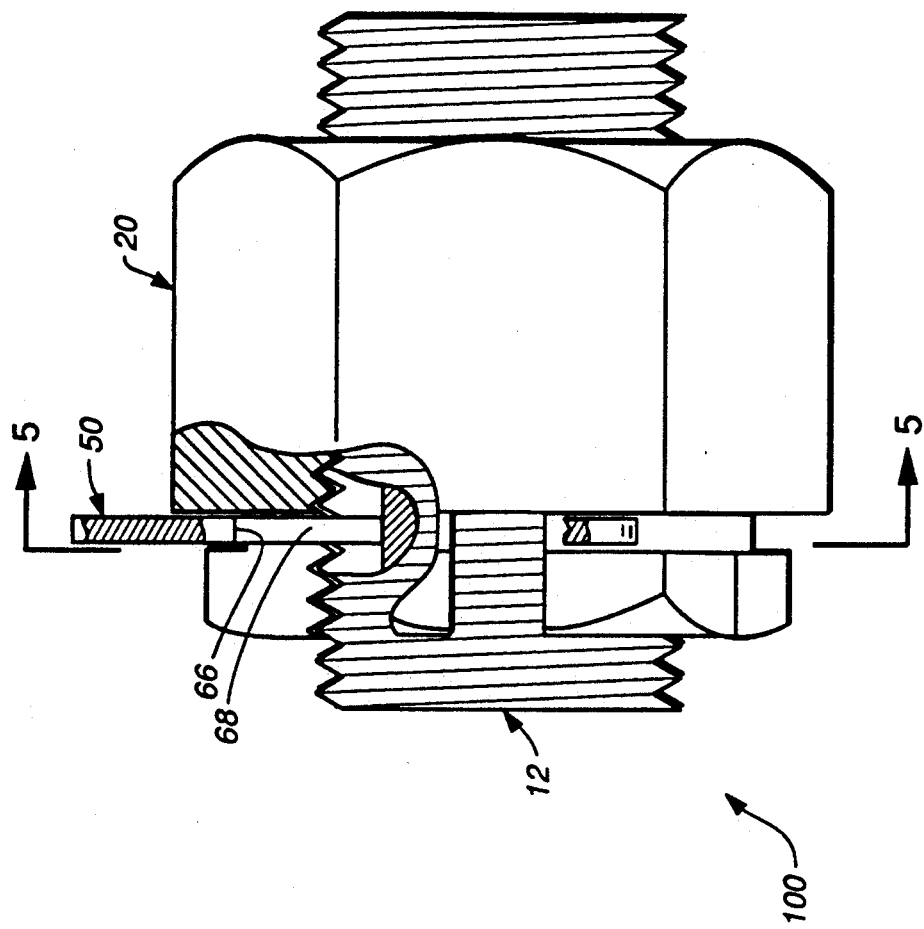
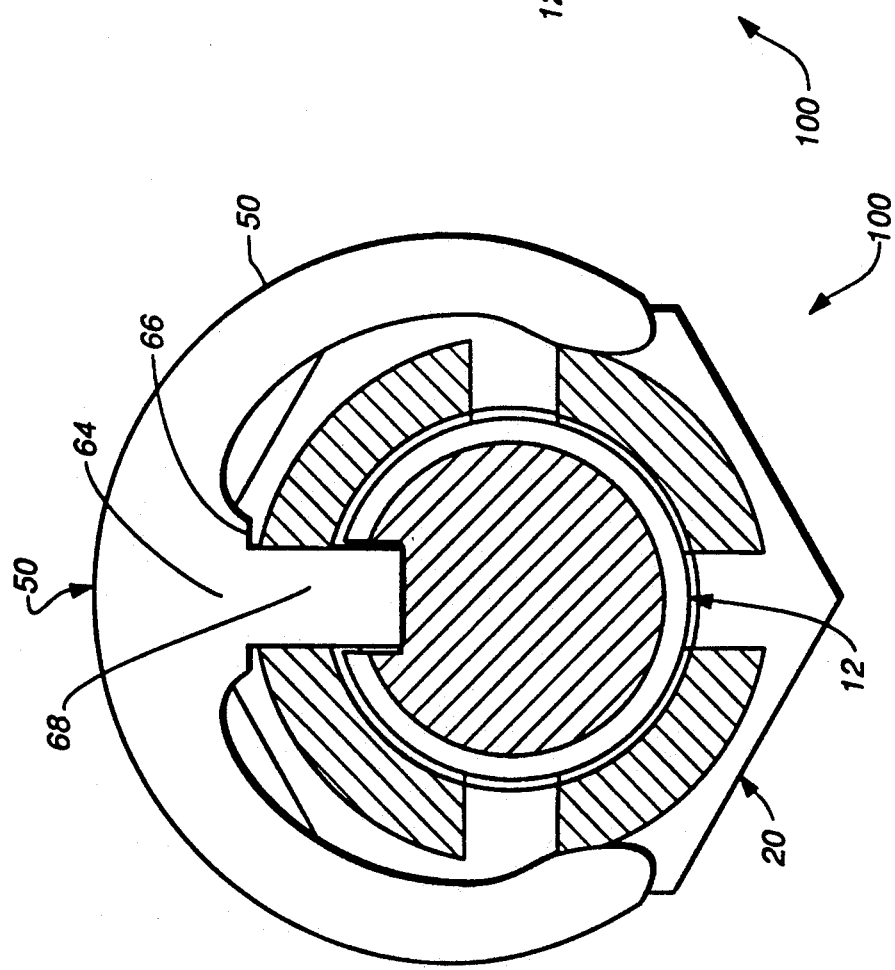
FIG._6
FIG._5

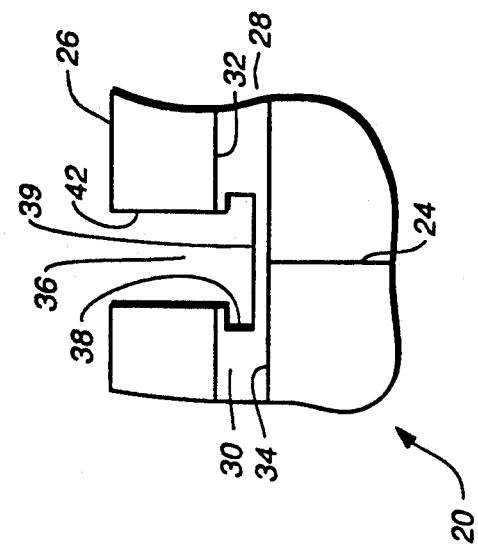
FIG._8
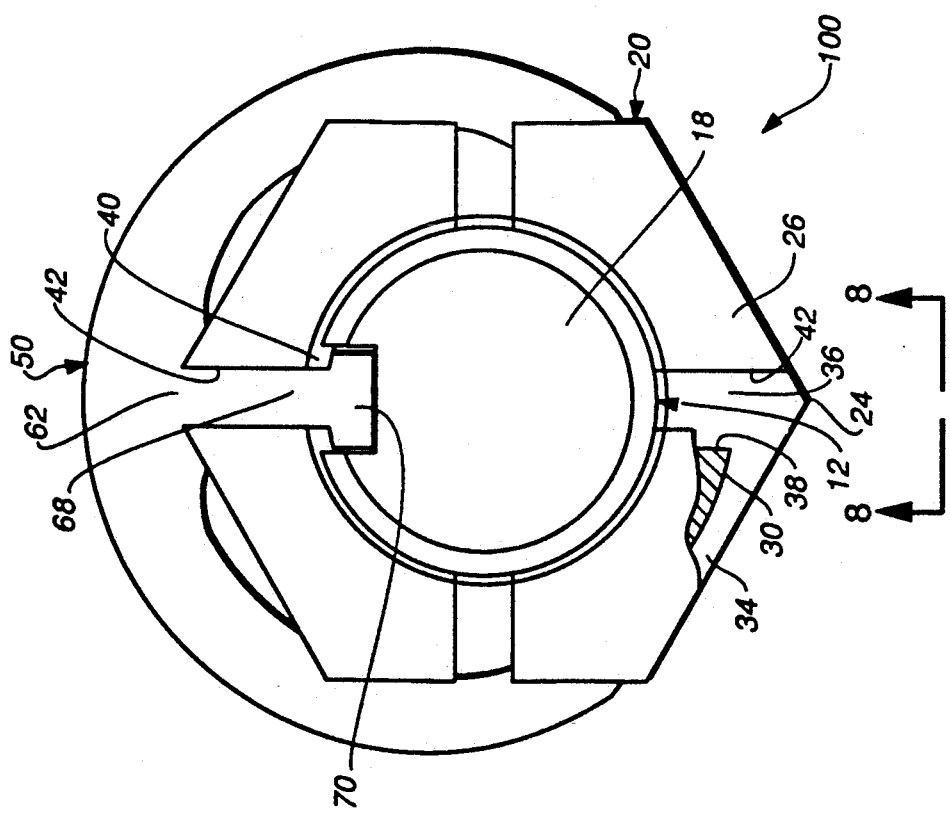
FIG._7

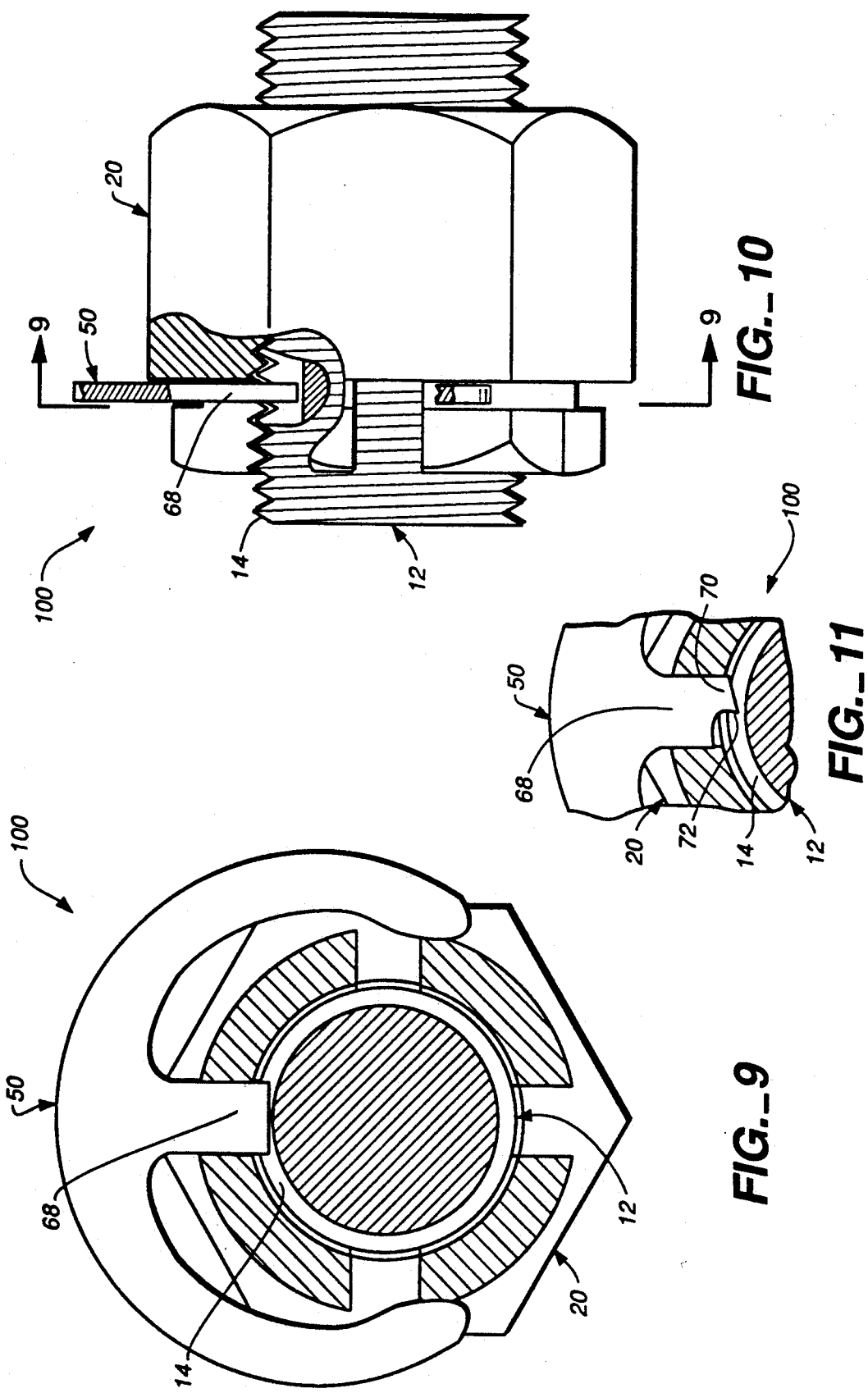

NUT AND SNAP RING POSITION LOCKING DEVICE

FIELD OF THE INVENTION

This invention pertains to apparatus for preventing the rotation of a nut with respect to a threaded shaft, and more particularly to a radially-slotted circumferentially-grooved nut and tanged snap ring assembly, one version suitable for use on a plain threaded shaft and another version suitable for use on a threaded shaft having an axial keyway.

BACKGROUND OF THE INVENTION

A wide variety of devices are commercially available that prevent the rotation of a nut with respect to a threaded shaft on which it is installed. Some devices, such as the common helical split lock washer, require that the nut be drawn up tightly in order to obtain a locking grip. Other devices, such as prevailing torque lock nuts, exert a constant resistance torque against rotation. This constant resistance to rotation can be an annoyance during the assembly of products, as it takes time and effort both to install and to remove prevailing torque lock nuts over long threaded shafts; also these nuts can usually be reused for only a few times before the initial prevailing torque starts diminishing due to the wearing away of rubbing surfaces. Washers having internal tangs that fit into shafts with axial keyways are sometimes used; after a nut is drawn up tightly against the washer an edge of the washer is simply bent back over a flat of the nut to prevent nut rotation. Nuts having radially slotted faces (castellated nuts) are commonly used with cotter pins which are inserted through the nut slots and radial holes through the shaft to positively prevent rotation. Both tanged washers and cotter pins are usually discarded after a single use; they are time consuming to install and remove, and used cotter pins laying around loose present a hazard to both personnel and machinery.

Hence there is a need for a simple, inexpensive, and reusable position locking device that will allow a nut to be freely installed over a long length of threaded shaft, yet will allow it to be locked in a desired position and then later unlocked and freely removed.

OBJECTS, FEATURES, AND ADVANTAGES

It is an object of the present invention to provide a position locking device for preventing the rotation of a nut with respect to a threaded shaft on which it has been installed.

It is an another object of the present invention to provide a position locking device that is releasable and hence will not interfere with the free spinning of a nut on to and off of a threaded shaft.

It is another object of the present invention to provide a position locking device that will engage in a fixed rotational position on a threaded shaft having an axial keyway of rectangular cross section.

It is another object of the present invention to provide a position locking device that will function as a releasable prevailing torque lock nut on a plain threaded shaft without a keyway.

It is another object of the present invention to provide a position locking device that can reused an unlimited number of times.

It is a feature of the present invention that the nut is in essence a conventional castellated nut (i.e., a nut slotted across a face) having the additional feature of a circumferential groove intersecting with the bottom of the castellation slots.

It is a feature of the present invention that the snap ring configuration is in essence that of a conventional radially-installed commercial snap ring having the additional feature of an elongated center tang.

It is an advantage of the present invention that the snap ring and the nut can snap together and continue to remain together as an assembly even when not installed on a shaft, hence obviating the need for individual packaging of each nut and snap ring assembly and avoiding the separation and loss of individual parts.

It is an advantage of the present invention that each individual component departs in only a minor structural way from existing mass-produced commercial hardware.

It is an advantage of the present invention that the snap ring can be easily engaged into and disengaged from its locking position with simple conventional tools.

SUMMARY OF THE INVENTION

The present invention solves the problems and satisfies the need for a simple, inexpensive, releasable and reusable position locking device that will allow a nut to be freely installed over a long length of threaded shaft, yet will allow it to be locked in a desired position and then later unlocked and freely removed.

The locking device consists of a simple nut and snap ring assembly. The nut is essentially a conventional castellated (i.e., radially slotted across a face) nut except that it has the one additional feature of a circumferential groove that intersects with the castellation slots at the bottom of the slots. The snap ring is essentially of the same configuration as a commercially available radially-installed snap ring except that it has the one additional feature of an elongated central tang. When assembled together the two components, which individually differ in only in a relatively minor way from the existing commercial counterpart, provide a new and useful position locking device.

Other advantages of this invention will become apparent from the description following when read in conjunction with the accompanying drawings.

BRIEF DESCRIPTION OF THE DRAWINGS

FIG. 1 is a cross sectional view, taken along line 1—1 in FIG. 2, of the nut and snap ring position locking device of the present invention as installed on a short length of threaded shaft having an axial keyway.

FIG. 2 is a side view of the position locking device installed on a threaded shaft having a keyway, with a portion of the nut and the snap ring arm (on near side) shown partially broken away to show the tang of the snap ring extending down to the bottom of the keyway in the shaft; the shaft is also shown partially broken away in order to reveal the keyway.

FIG. 3 is a proximate end view of the nut and snap ring position locking device of the present invention as installed on a short length of threaded shaft having an axial keyway, similar to the sectional view shown in FIG. 1. In FIGS. 1, 2, and 3 the snap ring is in the position relative to the nut hereby defined as "across flats", the snap ring arms appearing as if spanning across the flats of the nut.

FIG. 4 is another proximate end view of the nut and snap ring position locking device of the present invention as installed on a short length of threaded shaft having an axial keyway, similar to the view shown in FIG. 3 except that the snap ring is in the position hereby defined as "across points", the snap ring arms appearing as if spanning across the points of the nut.

FIGS. 5 and 6 are similar to FIGS. 1 and 2, except that the tang of the snap ring shown in FIGS. 5 and 6 is abruptly stepped down in width as it extends downward from a wider tang base region.

FIG. 7 is another proximate end view of the nut and snap ring position locking device of the present invention as installed on a short length of threaded shaft having an axial keyway, similar to the view shown in FIG. 3, except that here the four slots across the face of the nut have a cross section in the shape of an inverted "T" for gripping the snap ring tang; slots having such a cross-sectional shape are commonly termed T-slots.

FIG. 8 is a partial view taken along line 8—8 in FIG. 7, showing an end view of a T-slot across the proximate end face of the nut (with the stem of the "T" being uppermost).

FIGS. 9 and 10 are similar to FIGS. 1 and 2, except that here the threaded shaft does not have an axial keyway and the snap ring tang is made shorter so that it engages with the threaded surface of the shaft between adjacent external screw threads.

FIG. 11 is a partial view of a cross section (similar to the upper portion of FIG. 9) showing a snap ring with a tang tip having a sharp pointed edge disposed to dig into the sides of adjacent external screw threads so as to prevent the counter-clockwise rotation of the nut with respect to the shaft.

DRAWING REFERENCE NUMERALS 12 threaded shaft
14 external thread
16 axial keyway
18 shaft end
20 nut
22 nut flat
24 nut point
26 proximate nut face
27 distal nut face
28 circumferential groove
30 groove bottom surface
32 proximate groove wall surface
34 distal groove wall surface
36 radial slot
38 slot wall
39 slot bottom
40 internal thread
42 slot stem wall
50 snap ring
52 central base region
54 base blend radius
56 arm base region
58 arm
60 arm tip
62 tang base region
64 stepped tang base region
66 step surface
68 tang
70 tang tip
72 tang tip pointed edge
100 position locking device

DESCRIPTION OF THE PREFERRED EMBODIMENTS

Referring now to the drawings wherein like reference numerals are used to designate like or corresponding parts throughout the various figures thereof, there is shown in FIGS. 1 and 2 the nut and snap ring position locking device 100 of the present invention installed on a short length of round threaded shaft 12 having external threads 14, an axial keyway 16 of rectangular cross section, and ends 18. The position locking device 100 consists of two separate parts, a nut 20 and a snap ring 50.

The nut 20 illustrated herein is of conventional proportions for regular hex nuts, having six equally spaced nut flats 22 and six nut points 24 symmetrically located about the axis of the nut internal thread 40, and a proximate nut face 26 and a distal nut face 27 each perpendicular to said axis (although obviously the invention can be practiced with nuts of unconventional proportions). A circumferential groove 28 of rectangualr cross section, having a cylindrical groove bottom surface 30 and a proximate groove wall surface 32 and a distal groove wall surface 34, extends around the nut 20 in a plane perpendicular to the axis of the internal thread 40; the cylindrical groove bottom surface 30 is concentric with the axis of the internal thread 40. The groove bottom surface 30 should be sufficiently deep so that the groove walls 32 and 34 can engage with and thus provide axial support for snap ring 50, as illustrated in FIGS. 1, 2, 3, and 4. Parallel-walled flat-bottomed radial slots 36 having a cross-section including parallel side walls 38 and a flat bottom 39 perpendicular thereto (of a simple rectangular cross section as illustrated in FIGS. 1 and 2, or alternatively of a "T" cross section having two additional parallel slot stem walls 42 as illustrated in FIGS. 7 and 8) extend radially outward from the axis of the internal thread 40 across the proximate nut face 26, in a manner similar to the slots of a conventional castellated nut. Four radial slots 36, equally spaced about the axis of the internal thread 40, are illustrated for the preferred embodiment (although obviously other numbers or spacing arrangements could be used). The radial slots are of a sufficient depth such that they intersect and extend into the circumferential slot 28 (thus breaking up the continuity of the cylindrical groove bottom surface 30 and the proximate groove wall 32). The preferred slot depth tolerances for radial slots 36 having the simple rectangular cross section should be such that the radial slots 36 extend to or through (but do not stop short of) the distal circumferential groove wall 34, as illustrated in FIGS. 1 and 2. The preferred slot depth tolerances for radial slots 36 having the "T" cross section should be such that the entire portion of slot 36 bounded by walls 38 (i.e., the wider portion) should lie between (but not extend beyond) the proximate 32 and the distal 34 circumferential groove walls, as illustrated in FIG. 8. The nut 20 can be made from metals (e.g., steel or brass) or plastics (e.g., nylon) or other materials suitable for an intended use; for most applications mild steel will be the preferred nut material.

The snap ring 50 illustrated herein has a general configuration similar to that of commercially available snap rings designed for radial insertion into shaft grooves (for example, the snap ring sold by Waldes Kohinoor, Inc., under the trademark Truarc Series 5103 Crescent Retaining Ring), except that the snap ring 50 has an additional feature of an elongated central tang 68. The snap ring 50 is of flat planar construction of generally semi-circular shape, symmetric about a central base region 52, having two symmetrically-opposed inwardly-curving arms 58 extending outward from the base region 52 and one straight tang 68 centered between the arms 58 and extending from the central base region 52 in the direction toward the arm tips 60. Each arm 58 has an arm base region 56 and a rounded-off arm tip 60. The tang has a tang base region 62 and either a tang tip 70 that is flat as shown in FIG. 1, or a tang tip 70 having a sharp pointed edge 72 (disposed to dig into the sides of adjacent external screw threads) as shown in FIG. 11. A generous fillet radius 54 exists at the junction of each arm base region 56 with the tang base region 62, necessitated by the high bending stresses which occur when the arm tips 60 are forced over the groove bottom surface 30 in nut 20.

The shape of snap ring 50 is influenced by the requirement that the arm tips 60 grip the groove bottom surface 30 in nut 20 when the tang tip 70 is fully seated (fully seated in a shaft axial groove 16 or fully seated between adjacent shaft external threads 14, depending upon the application). For the preferred snap ring shape (as illustrated in FIG. 1) each arm tip contacts the nut groove bottom surface 30 at an angular position (with respect to the axis of the nut internal thread 40) of approximately 105 degrees from the middle of the radial slot 36 in which the tang 68 is inserted, this particular arrangement being influenced by the number and location of the radial slots 36 and by the amount of elastic deformation the arms 58 can accommodate in being forced over the groove bottom surface 30.

For most applications the preferred material for the snap ring 50 will be a high strength spring steel; for non-magnetic applications a beryllium-copper alloy would be practical. Other materials that are suitable for efficient use as spring materials could also be used, depending upon the requirements of the application (for example, aluminum alloy 7075-T6 or even a plastic such as nylon). The thickness of the snap ring 50 can vary depending upon the application. Care must be taken to avoid making the snap rings too thin (for example, if the thickness were chosen as a result of simple tang shear stress calculations), as the tang 68 can also fail by bending in the axial direction (i.e., bending of the tang in the direction along keyway 16 toward the proximate nut face 26) and by twisting (about the ring 50 axis of symmetry). For those snap rings 50 having short tangs 68 (as shown in FIGS. 9, 10, and 11) disposed to bear against shaft exterior threads 14 the preferred ring thickness should be approximately one-half of the distance between the points of adjacent threads, which will allow the tip 70 of the tang 68 to engage facing surfaces of external thread 14 (as shown in cross-section in FIG. 10). For example, the thickness for a snap ring to be used with a nominally one inch diameter shaft having a 1-8UNC thread would be 0.062 inches; the same thickness could also be used for the long tang ring so that different nuts would not be needed for applications with and without keyways on the same size threaded shaft. The tang width should be such that it has enough clearance to freely slip into a shaft having a standard width rectangular axial keyway, which usually has a width of about one-fourth of the shaft diameter. The preferred width of the nut radial slots should be a close but still free fit with the snap ring tang.

The version of the snap ring 50 shown in FIGS. 5 and 6 has a wide stepped tang base region 64 having step surfaces 66 located where the tang 68 abruptly steps down in width; this provides more ring area for engaging with the nut groove 28 near the ring central base region 52 when used with a version of nut 20 having simple rectangular radial slots 36. The T-slot version of nut radial slots 36 (shown in FIGS. 7 and 8) provides support for the tang 68 over a longer length than the simple rectangular slot version, and is the preferred radial slot design for heavy duty applications.

Although the above description contains many specificities these should not be construed as limiting the scope of the invention, to which variations and improvements may be made by those skilled in the art without departing from the scope of protection of the present patent and true spirit of the invention, but rather as exemplifications of preferred embodiments thereof. For example, a variation could be making the cross-section of the groove bottom surface 30 (of the circumferential groove 28 in the nut 20) in the shape of a regular polygon rather than in the shape of a circle, with a complementary modification of the snap ring 50 shape to suit. Accordingly, the scope of the invention should be determined not by the embodiments illustrated, but by the appended claims and their legal equivalents.

That which is claimed is:

1. A position locking device for use with an externally-threaded round shaft having at least one axial keyway of rectangular cross-section, comprising:

an internally-threaded nut disposed to engage with the externally-threaded shaft, said nut having a proximate end face and a circumferential groove oriented perpendicular to the nut internal thread axis, said groove having a cylindrical groove bottom surface concentric with the axis of said internal thread and a proximate groove wall surface and a distal groove wall surface each groove wall surface being substantially perpendicular to said groove bottom surface, said nut further having at least one parallel-walled flat-bottomed radial slot running across the proximate end face in a direction radially outward from the nut internal thread axis with the flat bottom parallel to the plane of said circumferential groove and of depth extending from said proximate end face to the distal wall of said groove; and a flat planar snap ring of generally semi-circular shape being symmetric about a central base region, having two symmetrically-opposed inwardly-curving arms extending outward from said base region and having a flat-tipped straight tang centered between said arms and extending from said base region in the direction toward the arm tips, said arms disposed to engage the nut circumferential groove with the arm tips gripping the groove bottom surface and said tang disposed to engage with and extend through a nut radial slot to engage with an axial keyway of a shaft engaged with said nut.

2. A position locking device as recited in claim 1 wherein a portion of each radial slot in said nut that is bounded by the proximate end face and the circumferential groove proximate wall is narrower than a portion of the radial slot lying between the proximate circumferential groove wall and the distal circumferential groove wall.

3. A position locking device as recited in claim 1 wherein the tang width is abruptly stepped down from that of a tang base region adjacent to the snap ring central base region.

4. A position locking device as recited in claim 2 wherein the tang width is abruptly stepped down from that of a tang base region adjacent to the snap ring central base region.

5. A position locking device for use with an externally-threaded round shaft comprising:

an internally-threaded nut disposed to engage with the externally-threaded shaft, said nut having a proximate end face and a circumferential groove oriented perpendicular to the nut internal thread axis, said groove having a cylindrical groove bottom surface concentric with the axis of said internal thread and a proximate groove wall surface and a distal groove wall surface each groove wall surface being substantially perpendicular to said groove bottom surface, said nut further having at least one parallel-walled flat-bottomed radial slot running across the proximate end face in a direction radially outward from the nut internal thread axis with the flat bottom parallel to the plane of said circumferential groove and of a depth extending from said proximate end face to the distal wall of said groove; and a flat planar snap ring of generally semi-circular shape being symmetric about a central base region, having two symmetrically-opposed inwardly-curving arms extending outward from said base region and having a straight tang centered between said arms and extending from said base region in the direction toward the arm tips, said arms disposed to engage the nut circumferential groove with the arm tips gripping the groove bottom surface and said tang disposed to engage with and extend through a nut radial slot with the tang tip bearing against the threaded surface of a shaft engaged with said nut.

6. A position locking device as recited in claim 5 wherein a portion of each radial slot in said nut that is bounded by the proximate end face and the circumferential groove proximate wall is narrower than a portion of the radial slot lying between the proximate circumferential groove wall and the distal circumferential groove wall.

7. A position locking device as recited in claim 5 wherein the thickness of said flat planar snap ring is approximately one-half of the distance between points of adjacent nut threads.

8. A position locking device as recited in claim 6 wherein the thickness of said flat planar snap ring is approximately one-half of the distance between points of adjacent nut threads.

9. A position locking device as recited in claim 5 wherein the tang width is abruptly stepped down from that of a tang base region adjacent to the snap ring central base region.

10. A position locking device as recited in claim 6 wherein the tang width is abruptly stepped down from that of a tang base region adjacent to the snap ring central base region.

11. A position locking device as recited in claim 7 wherein the tang width is abruptly stepped down from that of a tang base region adjacent to the snap ring central base region.

12. A position locking device as recited in claim 8 wherein the tang width is abruptly stepped down from that of a tang base region adjacent to the snap ring central base region.

13. A position locking device as recited in claim 5 wherein the tip of the tang has a sharp pointed edge.

14. A position locking device as recited in claim 6 wherein the tip of the tang has a sharp pointed edge.

15. A position locking device as recited in claim 7 wherein the tip of the tang has a sharp pointed edge.

16. A position locking device as recited in claim 8 wherein the tip of the tang has a sharp pointed edge.

17. A position locking device as recited in claim 9 wherein the tip of the tang has a sharp pointed edge.

18. A position locking device as recited in claim 10 wherein the tip of the tang has a sharp pointed edge.

19. A position locking device as recited in claim 11 wherein the tip of the tang has a sharp pointed edge.

20. A position locking device as recited in claim 12 wherein the tip of the tang has a sharp pointed edge.

21. A flat planar snap ring of generally semi-circular shape being symmetric about a central base region, having two symmetrically-opposed inwardly-curving arms extending outward from said base region, and having a straight tang centered between said arms and extending from said base region in the direction toward the arm tips, wherein the tip of the tang has a sharp pointed edge.

22. A snap ring as recited in claim 21 wherein the tang width is abruptly stepped down from that of a tang base region adjacent to the snap ring central base region.

* * * * *